Patented July 14, 1953

2,645,640

UNITED STATES PATENT OFFICE 2,645,640

PHENTHIAZINE DERIVATIVES

Paul Charpentier, Choisy-le-Roi, France, assignor to Societe des Usines Chimiques Rhone-Poulenc, Paris, France, a French body corporate No Drawing. Application December 17, 1951, Serial No. 262,171. In France December 21, 1950

3 Claims. (Cl. 260—243)

This invention relates to new phenthiazine derivatives having valuable therapeutic properties and to processes for the preparation of new phenthiazine derivatives.

The therapeutically active compounds of this invention are represented by the general formula:

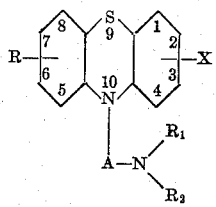

wherein:

R represents a hydrogen, chlorine or bromine atom or a methyl or methoxy group in the 6- or 8-position, X represents either a chlorine or a bromine atom in the 1- or 3-position, A represents a divalent, straight or branched aliphatic chain containing from 2 to 5 carbon atoms and $R_1$ and $R_2$ represent either individual methyl or ethyl groups or divalent groups which together with the adjacent nitrogen atom form a mononuclear heterocyclic ring.

In a preferred form of the invention, A represents an alkylene group containing from 2 to 5 carbon atoms and $R_1$ and $R_2$ each represent a methyl or ethyl group or together represent the atoms necessary to complete a pyrrolidine, piperidine or morpholine nucleus.

The compounds of the present invention are prepared from a meta-chloro- or -bromo diphenylamine (which may be substituted by a further chlorine or bromine atom or by a methyl or methoxy group) by known methods for the conversion of a diphenylamine into a N-dialkylaminoalkylphenthiazine. By the expression "known method" is meant any method heretofore described in the chemical literature.

One preferred process for preparing the new compounds involves condensing a phenthiazine compound represented by the general formula:

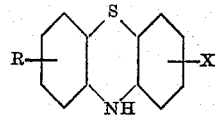

(wherein R and X are as hereinbefore defined) with a tertiary aminoalkyl halide of the formula:

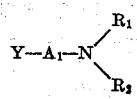

wherein Y represents a halogen atom and $R_1$ and $R_2$ have the significance hereinbefore defined and $A_1$ represents a divalent straight or branched aliphatic chain containing from 2 to 5 carbon atoms which may be the same as the chain represented by A in general Formula I or, in the case of a branched chain, an isomeric form thereof.

The reaction is preferably carried out in the presence of an acid-binding agent, being preferably a member of the class consisting of alkali metals and their derivatives, e. g. hydroxides, hydrides, amides, alcoholates and metal-alkyl or metal-aryl compounds. The preferred acid-binding agents are sodamide, metallic sodium, powdered sodium and potassium hydroxides, lithium hydride, sodium tertiary butylate, butyl lithium and phenyl lithium.

The reaction is also preferably carried out in an organic non-ionic diluent which is a solvent for at least one of the two reactants at or in the neighbourhood of the boiling point of the solvent. It is particularly advantageous to use the tertiary aminoalkyl halide in the form of the free base in solution in an organic solvent, for example, benzene, toluene or xylene, and to add the solution to a heated (preferably boiling) mixture of the phenthiazine compound, an acid-binding agent and said organic solvent. The reaction can also be carried out without added acid-binding agent by introducing the solution of tertiary aminoalkyl halide, a little at a time, into molten phenthiazine compounds. When following either of these two procedures, it is necessary in order to avoid loss of organic diluent that the reaction vessel be an autoclave or be fitted with a reflux condenser.

The tertiary aminoalkyl halide can be employed in the form of an acid salt but, in this case, it is obviously necessary to add a greater proportion of acid-binding agent in order to neutralize the acid liberated from the acid salt.

When the halogen and nitrogen atoms of a dimethyl- or diethylaminohalogenopropane are substituted on adjacent carbon atoms, as for example in the case of 1-dimethylamino-2-chloropropane, the expected product having the following chain:

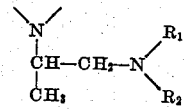

is not obtained but instead a mixture of this product and its isomer having the chain:

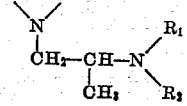

These can be separated by means of their hydrochlorides.

The new compounds of this invention can also be obtained by the condensation of a secondary amine of the general formula:

with a halogeno alkyl phenthiazine of the formula:

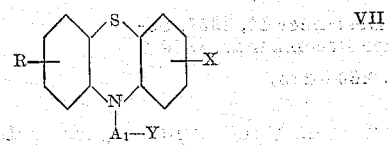

wherein X, R₁, R₂, A₁ and Y are as hereinbefore defined. This method is particularly suitable in the case where A₁ has the fromula —(CH₂)n—, n having the value 4 or 5.

The halogenophenthiazine compounds employed as starting material in one or other of the above-mentioned processes are prepared by the cyclisation of a meta-halogenodiphenylamine with sulphur, desirably in the presence of iodine as catalyst.

The cyclisation leads to a mixture of isomers which can be separated by the application of conventional techniques. In the case of meta-monochlorodiphenylamine:

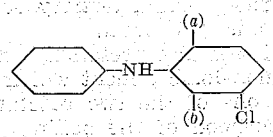

cyclisation takes place not only at (a) giving:

but also at (b) giving:

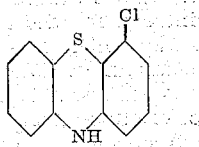

namely a mixture of 1- and 3-chlorophenthiazine which can be separated e. g. by fractional crystallisation from a suitable solvent such as benzene. When compounds of the type in which R is a substituent in the form of a chlorine or bromine atom or a methyl or methoxy group, the starting material is preferably a 3-halogeno-3'-R-substituted-diphenylamine the cyclisation of which as hereinbefore indicated leads to a mixture of isomers which can be separated as hereinbefore described. Such separation is not, however, essential and where it is not effected, a mixture of isomeric N-aminoalkylphenthiazines is produced. It should be understood that where in this specification and in the appended claims reference is made to "a halogeno- (or chloro- or bromo-)-phenthiazine" there is meant in the absence of a qualifying term a phenthiazine which contains a halogen (or chlorine or bromine) substituent in the 1- or 3-position or mixture of the respective isomers. Similarly by reference to a disubstituted phenthiazine e. g. a dihalogeno- (or dichloro- or dibromo-)phenthiazine is meant a phenthiazine in which a first substituent is in the 1- or 3-position and the second substituent is in the 6- or 8-position or a mixture of the respective isomers.

The products of this invention possess valuable therapeutic properties which renders them useful as antihistaminics, gangloplegics, spasmolytics, local anaesthetics, analgesics, sympatholytics and fungicides. They also possess an appreciable bactericidal effect on the tubercle bacillus. Finally, they have proved to be particularly interesting as potentiators of general anaesthetics, of analgesics and of local anaesthetics. By the term "potentiator" we mean a material which increases the duration of effect of the active substance. Of outstanding importance are the isomeric N - (3'-dimethylamino-propyl)-chlorophenthiazines, the hydrochlorides of which melt at 179–180° C. and 169–170° C. respectively.

The following examples illustrate the invention. The melting points given are the instantaneous melting points on the Maquenne block.

Example I

To a boiling suspension of 11.6 g. of chlorophenthiazine (consisting of a mixture of two isomers melting at 196-198° C. and 116–117° C. respectively, the latter in minor proportion) and 2.4 g. of sodamide (80%) in 60 cc. of xylene, there are added over a period of one hour 7.5 g. of 3-dimethylamino-1-chloropropane in solution in its own weight of xylene. At the end of the addition, heating is continued for one hour under reflux. After cooling, the contents are taken up in acidified water and the xylene separated. The aqueous layer is made strongly alkaline by means of sodium hydroxide in order to liberate the base and this is extracted with ether. On distillation of the ethereal extract there is obtained 10 - (3'-dimethylamino-propyl)-chlorophenthiazine which distils at 200 to 205° C. under a pressure of 0.8 mm. Hg. Its hydrochloride, recrystallised from chlorobenzene, melts at 177 to 178° C. while the picrate melts at 172–173° C.

From the recrystallisation liquors can be isolated the isomeric hydrochloride melting at 169–170° C.; the corresponding picrate melts at 137–138° C.

Example II

By operating as in Example I but starting from chlorophenthiazine (melting at 196 to 198° C.) there is obtained 10-(3'-di-methylamino-propyl)-chlorophenthiazine which distils at 200 to 205° C. under a pressure of 0.8 mm. Hg, of which the hydrochloride melts at 177 to 178° C. and the picrate at 172–173° C.

Example III

To a heated (125° C.) suspension of 28 g. of chlorophenthiazine (melting at 116 to 117° C.) and 7.2 g. of finely powdered caustic soda (98%) in 150 cc. of xylene, there is added little by little over a period of half an hour 64 ccs. of a xylene solution containing 18 g. of 1-dimethylamino-3-chloropropane. At the end of the addition, heating is continued under reflux for a further period of one and a half hours. Following the procedure of Example I there is obtained 19.6 g. of 10 - (3' - dimethylamino - propyl)-chlorophenthiazine which boils at 203 to 209° C. under a pressure of 0.7 mm. Hg, and of which the hydrochloride, on recrystallisation from absolute alcohol, melts at 169 to 170° C.

Example IV

By operating as in Example I but starting from 1-dimethylamino-2-chloropropane in place of the 3-dimethylamino-1-chloropropane, there is obtained, after distillation of the ethereal extract, a crude base which distils at about 235° C. under a pressure of 2 mm. Hg and which consists of a mixture of 10-(2'-dimethylamino-1'-propyl)-chlorophenthiazine and 10-(1'-dimethylamino-2'-propyl)-chlorophenthiazine with a predominance of the first mentioned isomer, the hydrochloride of which, recrystallised from absolute alcohol, melts at 236 to 237° C.

Example V

To a boiling suspension of 11.6 g. of chlorophenthiazine and 2.4 g. of 80% sodamide in 60 cc. of xylene there are added over a period of one hour 6 g. of 1-dimethylamino-2-chloroethane in solution in its own weight of xylene. At the end of the addition, heating is continued for one hour under reflux. After cooling, the mixture is taken up in acidified water and the xylene separated. The aqueous layer is rendered alkaline by means of sodium hydroxide in order to liberate the base and this is extracted with ether. On distillation of the etheral extract, there is obtained 10-(2'-dimethylaminoethyl)-chlorophenthiazine which distils at about 195° C. under a pressure of 0.9 mm. Hg.

Its hydrochloride, which is very slightly soluble in cold water, melts at 220 to 221° C. when recrystallised from alcohol.

Example VI

By operating as in Example V but starting from 1-diethylamino-2-chloroethane there is obtained 10 - (2' - diethylaminoethyl)-chlorophenthiazine which distils at 215° C. at a pressure of 2 mm. Hg and the hydrochloride of which, recrystallised from chlorobenzene, melts at 165 to 166° C.

Example VII

By operating as in Example V, but starting from 1-diethylamino-2-chloropropane there is obtained a crude base distilling at 230 to 235° C. under a pressure of 3 mm. Hg and which is composed of a mixture of 10-(2'-diethylamino-1'-propyl)-chlorophenthiazine and of 10-(1'-diethylamino - 2'- propyl)-chlorophenthiazine with a preponderance of the first mentioned isomer; the hydrochloride of this latter compound, recrystallised from chlorobenzene, melts at 200 to 201° C. and is very slightly soluble in cold water.

Example VIII

By operating as in Example V but starting from 3-dimethylamino-2.2-dimethyl-1-chloropropane there is obtained 10-(3'-dimethylamino - 2'.2' - dimethylpropyl) - chlorophenthiazine which distils at 220° C. under a pressure of 3 mm. Hg and the hydrochloride of which recrystallised from chlorobenzene, melts at 182 to 183° C.

Example IX

To a boiling suspension of 13.9 cc. of bromophenthiazine and 2.5 g. of sodamide (80%) in 80 cc. of xylene there are added over a period of one hour 8 g. of 3-dimethylamino-1-chloropropane in solution in its own weight of xylene. At the end of the addition, heating is continued for one hour under reflux. After cooling, the mixture is taken up in acidified water and the xylene separated. The aqueous layer is made alkaline by means of sodium hydroxide in order to liberate the base and this is extracted with ether. On distillation of the ethereal extract there is obtained 10-(3'-dimethylaminopropyl)-bromophenthiazine which distils at 186° C. under a pressure of 0.08 mm. Hg. Its hydrochloride melts at 170 to 171° C.

Example X

By operating as in Example IX but starting from 1-dimethylamino-2-chloropropane instead of 3-dimethylamino-1-chloropropane there is obtained, after distillation of the ethereal extract, a crude base which distils at 190 to 192° C. under a pressure of 0.15 mm. and is composed of a mixture of 10 - (2'- dimethylamino - 1'- propyl)-bromophenthiazine and of 10-(1'-dimethylamino-2'-propyl)-bromophenthiazine with a predominance of the first mentioned isomer, the hydrochloride of which, recrystallised from butyl alcohol, melts at 203-204° C.

Example XI

By operating as in Example I, but starting with 7.7 g. 3-dimethylamino-3-methyl-1-chlorobutane and 10 g. of chlorophenthiazine there is obtained 10 -(3'- dimethylamino - 3'- methyl - 1'- butyl)-chlorophenthiazine, B. P.=195 to 205° C. under a pressure of 0.1 mm. Hg which, after recrystallisation from ether, melts at 123° C.

Example XII

By operating as in Example I, but starting with 8.8 g. of 2-dimethylamino-1-chlorobutane and 10 g. of chloro-phenthiazine there is obtained 10 -(2'- dimethylamino-1'-butyl)-chlorophenthiazine, B. P.=171 to 187° C. under a pressure of 0.11 mm. Hg, the hydrochloride of which melts at 209 to 210° C.

Example XIII

In the same manner, starting with 14.2 g. of 3-dimethylamino-1-chlorobutane and 20.4 g. of chlorophenthiazine there is obtained 10 -(3'- dimethylamino - 1'- butyl) - chlorophenthiazine, B. P.=203 to 204° C. under a pressure of 0.2 mm. Hg, the hydrochloride of which melts at 184 to 185° C.

Example XIV

Starting from 5.9 g. of 2-dimethylamino-2-methyl-1-chloropropane and 8.5 g. of chlorophenthiazine there is obtained 10-(2'-dimethylamino-2'-methyl-1'-propyl)-chlorophenthiazine, B. P.=170 to 185° C. under a pressure of 0.1 mm. Hg, the hydrochloride of which melts at 240° C.

Example XV

Starting from 9.6 g. of 3-dimethylamino-1-chloropentane and 15 g. of chlorophenthiazine there is obtained 10-(3'-dimethylamino-1'-pentyl)-chlorophenthiazine, B. P.=203 to 206° C. under a pressure of 0.15 mm. Hg, the acid oxalate of which melts at 131 to 133° C.

Example XVI

By operating as in Example V, but starting from β-chloroethyl-N-pyrrolidine there is obtained 10-(2'-pyrrolidine-ethyl)-chlorophenthiazine distilling at 230° C. at a pressure of 1.5 mm. Hg and the hydrochloride of which, recrystallised from chlorobenzene, melts at 164° C.

Example XVII

To a suspension held at 125° C. of 11.6 g. of chlorophenthiazine and 3 g. of finely powdered 98% caustic soda in 60 cc. of xylene there are added over a period of one hour 7.5 g. of N-(β-chloroethyl)-piperidine in solution in two parts of xylene. The process is then continued as in Example III. There is obtained 10-(2'-piperidinoethyl)-chlorophenthiazine which distils at 245° C. under a pressure of 2.5 mm. Hg and the hydrochloride of which, recrystallised from chlorobenzene, melts at 187 to 188° C.

Example XVIII

By operating as in Example V, but starting with β-chloroethyl-N-morpholine there is obtained 10 - (2' - morpholino-ethyl)-chlorophenthiazine which distils at 260° C. under a pressure of 2 mm. Hg and the hydrochloride of which, after recrystallisation from alcohol, melts at 192 to 193° C.

Example XIX

Starting from 11.7 g. of 3-pyrrolidino-1-chloropropane and 15 g. of chlorophenthiazine there is obtained 10 - (3'-pyrrolidino-1'-propyl)-chlorophenthiazine, B. $P_{0.15}$=210° C.

Example XX

Starting from 4.2 g. of 3-dimethylamino-1-chloropropane and 7.4 g. of methylchlorophenthiazine (M. P. 267 to 270° C. prepared by condensation of sulphur and 3-methyl-3'-chlorodiphenylamine in the presence of a little iodine at 160 to 180° C.) there is obtained 10-(3'-dimethylamino - 1' - propyl) - methylchlorophenthiazine, B. $P_{0.1}$=240 to 250° C., the acid oxalate of which melts at 120° C. with decomposition.

Example XXI 5.34 g. of dichlorophenthiazine (M. P. 259 to 260° C.; prepared by condensation of sulphur and 3:3'-dichlorodiphenylamine in the presence of a little iodine at 180° C.) in 100 ccs. of xylene are heated at 130° C. until dissolution is complete. There is then rapidly added 0.3 g. of powdered lithium hydride, then 15 cc. of a 20% xylene solution of 3 - dimethylamino - 1 - chloropropane. Heating is continued under reflux for four hours. After cooling, the mixture is taken up in 200 cc. of water and acidified with hydrochloric acid up to change of colour of Methyl Orange. The oily layer which separates is decanted. It crystallises rapidly, is filtered off, washed first with water and then with ether and dried under vacuum in the presence of sulphuric acid. There are thus obtained 4.9 g. of the hydrochloride of 10-(3'-dimethylamino - 1' - propyl)-dichlorophenthiazine which, after recrystallisation from absolute alcohol, melts at 215 to 218° C.

Example XXII

By proceeding as in Example XXI, but with 38 cc. of a 9.86% xylene solution of 3-dimethylamino-2.2-dimethyl-1-chloropropane there is obtained the hydrochloride of 10-(3'-dimethylamino-2'.2'-dimethyl-1'-propyl) - dichlorophenthiazine as an oil. This oil is taken up in water, rendered alkaline with sodium hydroxide and extracted with ether; the base obtained solidified and, after recrystallisation from alcohol, melts at 127 to 128° C.; the corresponding hydrochloride melts at 222 to 224° C.

Example XXIII

By proceding as in Example XXI, but with 10 cc. of a 37% xylene soltuion of 3-pyrrolidino-1-chloropropane there is obtained the hydrochloride of 10-(3'-pyrrolidino-1'-propyl)-dichlorophenthiazine in the form of an oil which is taken up in water and rendered alkaline with sodium hydroxide. The base liberated is extracted with ether and the ether driven off. There is obtained 4.85 g. of base which distils at 240° C. under a pressure of 0.15 mm. Hg. By the action of hydrogen chloride in ether on an ethereal solution of the base, the hydrochloride is obtained which is filtered off, washed with anhydrous ether and dried in vacuo over sulphuric acid, M. P.=157 to 160° C.

Example XXIV

Proceeding as in Example XXI but starting from 5.3 g. of chloromethoxyphenthiazine (M. P. 201 to 202° C.; prepared by condensation of sulphur and 3-chloro-3'-methoxydiphenylamine in the presence of a little iodine at 140° C.), 65 cc. of xylene, 0.3 g. of powdered lithium hydride and 10 cc. of xylene solution containing 3.69 g. of 3-pyrrolidino-1-chloropropane. After cooling, the mixture is taken up in 200 cc. of water and acidified with concentrated hydrochloric acid in the presence of Methyl Orange. The aqueous layer is decanted and washed with ether. It is rendered alkaline to phenolphthalein with concentrated sodium hydroxide solution and the base which separates is extracted with ether. The ethereal solution is dried over sodium sulphate, the ether driven off and the residue distilled. There is obtained 3.6 g. of 10-(3'-pyrrolidino-1'-propyl)-chloromethoxyphenthiazine which distils at 208 to 210° C. under pressure of 0.1 mm. Hg. Its oxalate, recrystallised from 50% aqueous alcohol, melts at 172 to 173° C.

Example XXV 15 g. of 10-(5'-chloro-1'-pentyl)-chlorophenthiazine and 20 g. of anhydrous dimethylamine are mixed at 0° C. in an autoclave which is hermetically sealed, agitated to dissolve the contents and then left for a week at 20° C. It is then cooled in ice to enable the container to be opened and the excess of dimethylamine then driven off. The contents are taken up in 200 cc. of distilled water, acidified to Congo Red with 9 cc. of hydrochloric acid (S. G.=1.1), then extracted at 80° C. with 150 cc. of toluene. The aqueous layer is decanted and rendered alkaline with 11 cc. of sodium carbonate (S. G.=1.33) and then extracted with 100 cc. of chloroform. By distillation of the chloroform extract there are obtained 9.1 g. of 10-(5'-dimethylamino-1'-pentyl)-chlorophenthiazine, B. $P_{0.3}$=215 to 218° C. The oxalate of this base melts at 173 to 174° C.

The 10-(5'-chloro-1'-pentyl)-chlorophenthiazine (B. $P_{0.15}$=255° C.) employing as starting material is obtained by the action of aluminum chloride in carbon bisulphide on 10-(5'-phenoxy-1'-pentyl)-chlorophenthiazine (B. $P_{.1}$=255 to 280° C. which is itself prepared by the action of 1-phenoxy-5-bromopentane (Braun and Steindorff B. 38, 963 (1905)) on chlorophenthiazine in boiling xylene in the presence of sodamide.

Example XXVI 25 g. of 10-(4'-chloro-1'-butyl)-chlorophenthiazine and 17.4 g. of anhydrous dimethylamine are mixed at 0° C. in an autoclave which is hermetically sealed, agitated in order to dissolve the contents and then left for 24 hours at 20° C. and subsequently for 24 hours at 35° C. It is cooled in ice in order to permit opening of the container and the excess dimethylamine then driven off. The contents are taken up in 200 cc. of water, rendered acid to Methyl Orange with hydrochloric acid (S. G.=1.19), extracted with two successive portions of 100 cc. of toluene and then with 100 cc. of ether. The aqueous layer is made alkaline with 10 cc. of sodium carbonate (S. G. 1.33) and then extracted with 200 cc. of ether. On distillation there are obtained 17.1 g. of 10-(4'-dimethylamino-1'-butyl)-chlorophenthiazine, (B. P.$_{0.16}$=210 to 214° C.). The hydrochloride of this base melts at 161 to 162° C.

The 10-(4'-chloro-1'-butyl)-chlorophenthiazine employed as starting material is obtained by the action of thionyl chloride in benzene on 10-(4'-hydroxy-1'-butyl)-chlorophenthiazine which is itself prepared by hydrochloric acid hydrolysis in 70% alcohol of 10-(4'-(2''-tetrahydropyranyloxy)-1'-butyl)-chlorophenthiazine (B. P.$_{0.3}$=230 to 248° C. In order to prepare the latter product dihydropyran is condensed with 4-chlorobutanol in the presence of a few drops of hydrochloric acid and the 2'-tetrahydropyranyl-4-chlorobutyl ether (B. P.$_{.2}$=90 to 93° C.) formed is reacted with chlorophenthiazine in boiling xylene in the presence of sodamide.

*Example XXVII*

31 g. of crude 10-(3'-chloro-1'-propyl)-chlorophenthiazine is mixed with 50 cc. of a 30% alcoholic solution of dimethylamine and the mixture heated in a sealed tube for seven hours at 120° C. The alcohol and the excess of dimethylamine are then driven off, the mixture taken up in acidified water and filtered. It is made alkaline with soda and extracted with ether. The ether is driven off and the residue distilled; there is obtained 10-(3'-dimethylamino-1'-propyl)-chlorophenthiazine, B. P.$_{0.3}$=200 to 210° C., the hydrochloride of which melts at 177 to 178° C., the red-coloured picrate at 169° C. and the methyl sulphomethylate at 140 to 141° C. The 10-(3'-chloro-1'-propyl)-chlorophenthiazine is prepared in a manner analogous to that described by Gilman and Shirley J. A. C. S. 66, 890 (1944), by the action of γ-chloro-propyl-p-toluene sulphonate on lithium chlorophenthiazine.

I claim:
1. A member of the class consisting of phenthiazine derivatives having the basic structural formula:

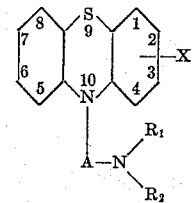

wherein X represents a member of the class consisting of chlorine and bromine atoms, in the 1 and 3 positions; A represents an alkylene chain containing from 2 to 5 carbon atoms; and R$_1$ and R$_2$ represent members of the class consisting of methyl and ethyl groups.

2. A phenthiazine compound having the basic structural formula:

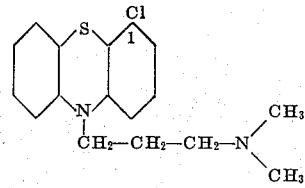

3. A phenthiazine compound having the basic structural formula:

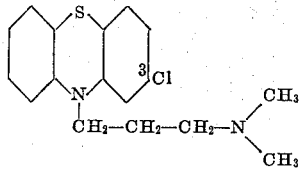

PAUL CHARPENTIER.

References Cited in the file of this patent
UNITED STATES PATENTS

| Number | Name | Date |
|---|---|---|
| 2,512,520 | Cusic | June 20, 1950 |
| 2,534,237 | Cusic | Dec. 19, 1950 |